C. E. HATCH.
PISTON FOR ENGINES.
APPLICATION FILED JULY 16, 1920.
1,388,338. Patented Aug. 23, 1921.
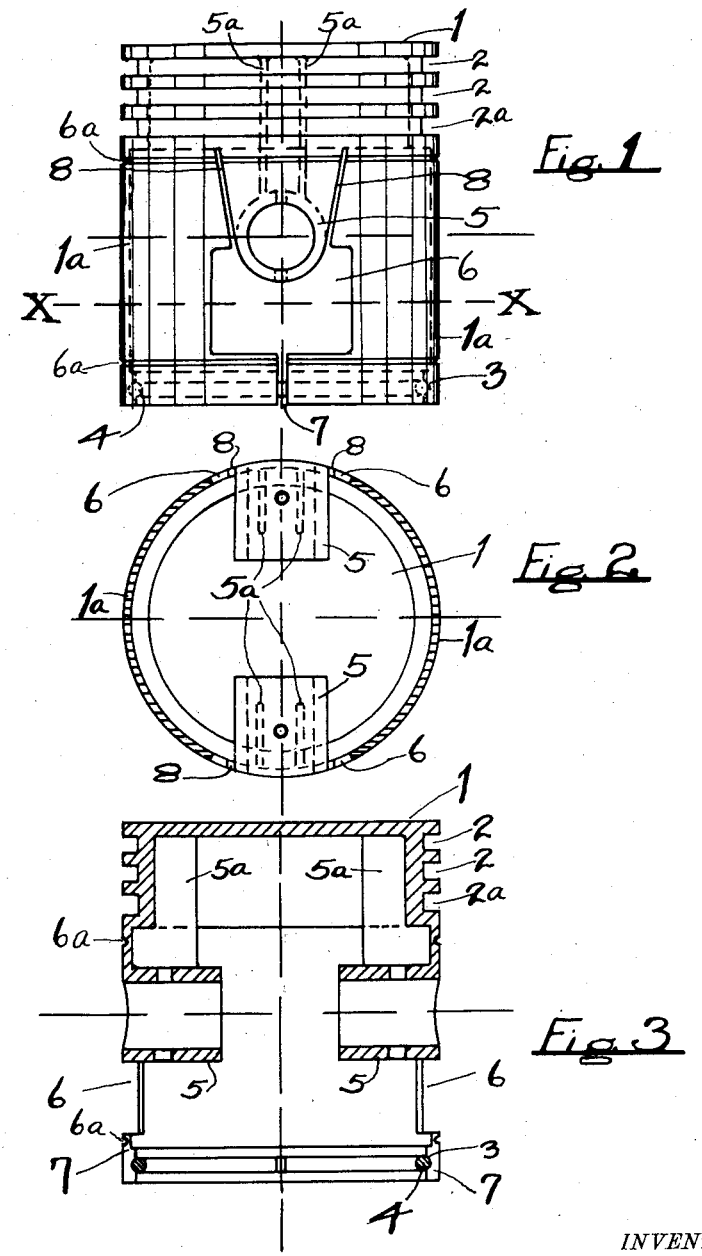
WITNESSES: INVENTOR.
Charlie E. Hatch
ATTORNEY.

UNITED STATES PATENT OFFICE.

CHARLIE E. HATCH, OF DENVER, COLORADO.

PISTON FOR ENGINES.

1,388,338.　　　Specification of Letters Patent.　　Patented Aug. 23, 1921.

Application filed July 16, 1920. Serial No. 396,652.

*To all whom it may concern:*

Be it known that I, CHARLIE E. HATCH, a citizen of the United States, and resident of Denver, county of Denver, and State of Colorado, have invented certain new and useful Improvements in Pistons for Engines, of which the following is a specification.

The object of my invention is to provide a piston with a resiliently expanded split skirt, but without the wrist pin lugs being subjected to this expansion action and the consequent slight binding effect on the wrist pin in pistons in which the pin is clamped in the connecting rod end; and in pistons in which the wrist pin is clamped or fastened in the wrist pin lugs.

A further object is to provide a resiliently expanded split skirted piston in which by the construction of the skirt the oil splash and air may come into contact with a portion of the cylinder walls intermediate the ends of the piston, giving a lubrication which a full walled piston of this type lacks.

A further object is to provide a piston in which the wrist pin lugs are rigidly connected to the piston head, and the thrust surfaces of the piston walls, which take the side thrust of the connecting rod, are resiliently expanded to prevent any side slap and to take up for any wear.

In a resiliently expanded split skirted piston, though the pressure due to the expanding inner ring may produce a pressure upon the piston walls that is small per unit area, still the result is that the piston fits the cylinder closely at all times, and under extreme conditions of running, this tends to prevent enough oil remaining between the cylinder and piston walls to efficiently lubricate same. That is, the close, spring-held fit of the piston, which is much like that of a piston ring, tends to wipe the lubricating oil too completely from the cylinder walls.

Also, in the ordinary split skirted piston, the wrist pin lugs are in a way floating; that is, they are subject to the movement of the piston walls when expanded by the inner piston ring. This movement of the wrist pin lugs tends to bind the wrist pin slightly in a piston in which the wrist pin is clamped in the connecting rod end; and in a piston in which the wrist pin is fastened in the wrist pin lugs of the piston, the free movement of expansion of the piston walls is hampered by the close fit between the wrist pin and the wrist pin lugs.

In my present invention both of these objections to the ordinary resiliently expanded split skirted piston, are overcome, as will be seen below.

In the drawings, Figure 1 shows a side elevation of my piston, looking on the end of the wrist pin bore; Fig. 2 shows a horizontal section through the piston on the line X—X; and Fig. 3 shows a vertical section through the piston through the wrist pin lugs.

The piston I, is provided with the usual piston ring grooves, 2, 2, $2^a$, and with the inner piston ring groove 3, into which is to be snapped the inner piston ring 4, preferably made of spring steel. This ring 4, may of course, be made of any other proper material or design if desired.

The wrist pin lugs, 5, 5 are properly ribbed by the ribs $5^a$, $5^a$, $5^a$, $5^a$, or similar reinforcement.

Below the wrist pin lugs 5, 5, are the apertures or windows 6, 6, through which the oil splashes and air reaches the cylinder walls intermediate the ends of the piston, giving ample lubrication in spite of the close fit of the piston against the cylinder walls.

The oil grooves $6^a$, $6^a$, help to distribute the oil about the piston.

The cuts 7, 7, extend from the lower end of the piston I to these windows 6, 6, directly below the wrist pin lugs 5, 5.

On either side of each wrist pin lug 5, 5, are the diverging cuts 8, 8, extending from the windows 6, 6, nearly to the lower piston ring groove $2^a$.

Above these cuts 8, 8, the piston is slightly relieved, about the same as is usual with the upper ends of ordinary pistons.

The windows 6, 6, may if desired extend upward to the upper end of the cuts 8, 8, thus combining the cuts 8, 8, with the window 6. But, I prefer the construction as shown in Fig. 1.

It will now be seen that the wrist pin lugs 5, 5, are rigidly supported and that the cuts 7, 7, and 8, 8, 8, 8, allow the inner piston ring 4 to expand the thrust surfaces $I^a$, $I^a$, of the piston skirt so that they will closely fit against the cylinder walls.

Thus, in my piston are combined the advantages of the solid form of piston with those of the resiliently expanded split skirted form of piston, without the main disadvantages of either form.

Having now described my invention, what I claim as new, and desire to secure by Letters Patent is as follows:—

1. A piston composed of a head portion provided with a plurality of piston ring grooves and wrist pin lugs depending therefrom and rigidly supported thereon, a skirt portion depending from said head portion separate from said wrist pin lugs and provided with a full cylindrical portion at the lower end thereof with two cuts therethrough longitudinal in extent, and with an internal ring groove within said cylindrical portion, and an expanding ring within said internal ring groove.

2. A piston comprising an upper end portion of unbroken periphery provided with a plurality of piston ring grooves and with two wrist pin lugs rigidly integral therewith, and a skirt portion in two sections depending from said upper end portion and separate from said wrist pin lugs and forming at their lower end a cylindrical portion provided with two cuts therethrough longitudinal in extent, and with an internal ring groove within said cylindrical portion, and an expanding ring within said internal ring groove.

3. A piston comprising a closed head portion provided with piston ring grooves and two wrist pin lugs rigidly integral therewith, and a skirt portion in two sections depending from said head portion separate from said wrist pin lugs and forming a lower cylindrical portion provided with two cuts therethrough longitudinal in extent and expanding means within said cylindrical portion.

4. A piston comprising a head portion with piston ring grooves, wrist pin lugs, means connecting said lugs rigidly to said head portion, a skirt portion in two parts separate from said wrist pin lugs and forming at their lower ends a cylindrical section of two segments each nearly semi-circular in extent, and expanding means within said cylindrical section.

5. A piston comprising a head portion with piston ring grooves and wrist pin lugs integral therewith, a skirt portion depending from said head portion separate from said wrist pin lugs and provided with a lower cylindrical end portion cut through in two places, a groove within said cylindrical end portion, and means therein exerting an outward pressure thereon.

CHARLIE E. HATCH.